(12) United States Patent
Dasari et al.

(10) Patent No.: US 8,219,441 B2
(45) Date of Patent: Jul. 10, 2012

(54) ALGORITHM SYSTEM AND METHOD

(75) Inventors: Arundat Mercy Dasari, Bangalore (IN); Nithya Ramkumar, Bangalore (IN); Amit Vikram, Bangalore (IN); Amit Saini, Pune (IN)

(73) Assignee: Wipro Limited, Bangalore, Karnataka (IN)

( * ) Notice: Subject to any disclaimer, the term of this patent is extended or adjusted under 35 U.S.C. 154(b) by 1036 days.

(21) Appl. No.: 12/168,923

(22) Filed: Jul. 8, 2008

(65) Prior Publication Data

US 2010/0010843 A1 Jan. 14, 2010

(51) Int. Cl.
*G06F 11/00* (2006.01)
*G07B 15/00* (2011.01)
*G06Q 10/00* (2012.01)
(52) U.S. Cl. ................... 705/12; 705/11; 705/13
(58) Field of Classification Search ............ 705/7.11–13
See application file for complete search history.

(56) References Cited

U.S. PATENT DOCUMENTS

| | | | | |
|---|---|---|---|---|
| 7,590,594 | B2 * | 9/2009 | Gunewardena et al. | 705/38 |
| 7,660,645 | B2 * | 2/2010 | Izumi et al. | 700/121 |
| 7,827,435 | B2 * | 11/2010 | Sahoo et al. | 714/4.1 |
| 7,991,593 | B2 * | 8/2011 | Olsen et al. | 703/2 |
| 8,020,161 | B2 * | 9/2011 | Markov | 718/103 |
| 2003/0023543 | A1 * | 1/2003 | Gunewardena et al. | 705/38 |
| 2004/0013089 | A1 * | 1/2004 | Taneja et al. | 370/235 |
| 2006/0136922 | A1 * | 6/2006 | Zimberg et al. | 718/100 |
| 2006/0218551 | A1 * | 9/2006 | Berstis et al. | 718/102 |
| 2007/0039001 | A1 * | 2/2007 | Briccarello et al. | 718/102 |
| 2009/0113442 | A1 * | 4/2009 | Deidda et al. | 718/105 |

OTHER PUBLICATIONS

Velaga, Prasad. "Job Shop Scheduling, Production Scheduling for Job Shops." Optisol, Texas, 2007, <http://www.optisol.biz/job_shop_scheduling.html>.*
Iqbal, Saeed, Gupta, Rinku and Fang, Yung-Chin. "Planning Considerations for Job Scheduling in HPC Clusters." Hgh-Performance Computing, reprinted from Dell Power Solutions, Feb. 2005.*
Chaubal, Charu. "Scheduler Policies for Job Prioritization in the Sun N1™ Grid Engine 6 System." Sun Microsystems, Inc., Sun Blue Prints™ Online, Oct. 2005.*
Weng, Michael X. and Ren Haiying."An efficient priority rule for scheduling job shops to minimize mean tardiness." IIE Transactions (2006) 38, 789-795.*
Yu, Jianming, Krishnan, Krishna Kumar and Gheraghi, Hossein."A Real-time Scheduling Algorithm for Agil Manufacturing." Wichita State University, Kansas, Apr. 2003.*
Seegmuller, DM, Visagie, SE, de Kock, HC and Pienaar, WJ"Selection and scheduling of jobs with time-dependent duration." ORSSA vol. 23 (1), pp. 17-28, Jan. 2007.*
Chiang, T.C. and Fu, L.C. "Using dispatching rules for job shop scheduling with due date-based objectives." International Journal of Production Research, vol. 45, No. 14, Jul. 15, 2007, 3245-3262.*

* cited by examiner

*Primary Examiner* — Beth V Boswell
*Assistant Examiner* — Renae Feacher
(74) *Attorney, Agent, or Firm* — Prakash Nama; Global IP Services, PLLC (57) ABSTRACT

An algorithm system and method is disclosed. In one embodiment, a method includes selecting an algorithm to calculate a demand factor for each job in a job list requiring a demand factor calculation, calculating the demand factor using the selected algorithm, and assigning the calculated demand factors to the corresponding jobs in the job list. The calculating demand factor using the selected algorithm includes utilizing data associated with a job in the job list to calculate the demand factor using the selected algorithm. For example, the data includes aging data of the jobs, job status data, and client priority data of the job.

12 Claims, 6 Drawing Sheets

ALGORITHM SYSTEM AND METHOD

FIELD OF THE INVENTION

The present invention relates to business processing, and more specifically to an algorithm system and method.

BACKGROUND

In business process execution, a major challenge may be in mapping resources to jobs, e.g., job sets, waiting processing in a system. The resources available within a system need to be continuously mapped and remapped to the job set as the business process execution conditions change dynamically and in real time. The mapping and remapping of resources is essential to meet predefined service level agreement (SLA) requirements and to ensure satisfaction of an end user of the business process execution.

A further mapping challenge is found in meeting specific process requirements. In some instances, the attempts to map resources may result in one or more of the following: a low throughput of jobs in the system, a substandard level of quality, an unacceptable job cost, and an unacceptable overall cost of the system.

Another mapping challenge is found in ensuring that incompatible job/resource combinations are not mapped, which would otherwise result in substandard or failed results.

Still another mapping challenge is found in reducing the complexity of the mapping process to avoid adverse consequences such as excessive overhead processing and costs.

BRIEF DESCRIPTION OF THE DRAWINGS

Embodiments of the present invention are illustrated by way of examples and not limited to the figures of the accompanying drawings, in which like references indicate similar elements and in which.

Other features of the present embodiments will be apparent from the accompanying drawings and from the detailed description that follows.

DETAILED DESCRIPTION

An algorithm system and method is disclosed. In the following description, for purposes of explanation, numerous specific details are set forth in order to provide a thorough understanding of the various embodiments. However, it will be evident to one skilled in the art that the various embodiments may be practiced without these specific details.

Figure 1:
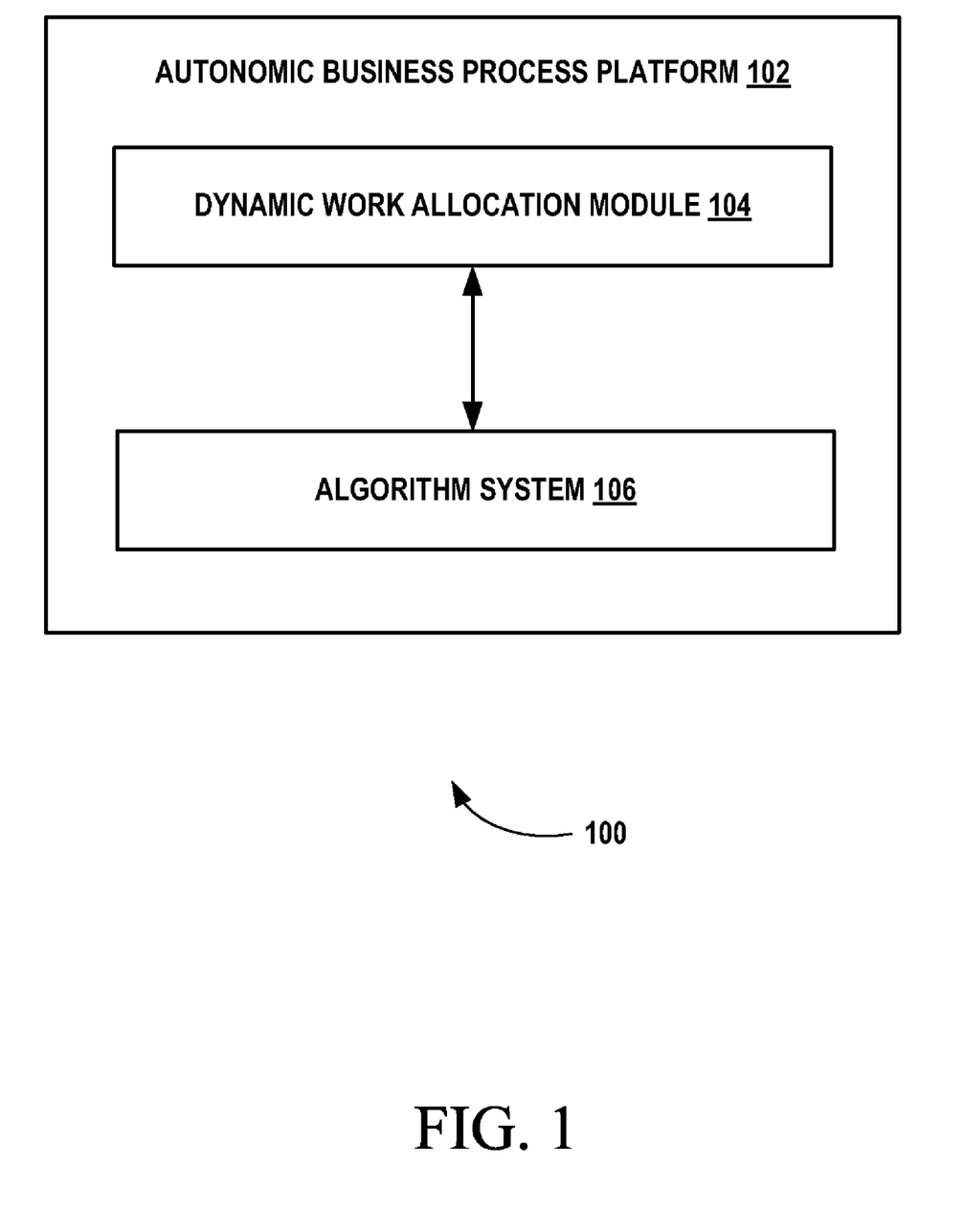
FIG. 1 shows a block diagram illustrating dynamic work allocation functionality in an autonomic business process platform, according to one embodiment.

FIG. 1 shows a block diagram 100 illustrating dynamic work allocation functionality in an autonomic business process platform 102, according to one embodiment. Particularly, FIG. 1 illustrates a dynamic work allocation module 104 and an algorithm system 106.

The autonomic business process platform 102 is a specialized service oriented architecture (SOA) platform for building and delivering business processes and services. For executing various business processes and tasks, the autonomic business process platform 102 includes various modules like dynamic work allocation module 104, quality control management module, service level agreement (SLA) management module, reporting management module, etc. that aid in appropriate and proper execution of the business processes through enabling necessary functionalities.

For example, the dynamic work allocation module 104 enables right allocation of jobs to appropriate agents in order to maximize probability of meeting business objectives. In some embodiments, the agents available within a process need to be continuously mapped and remapped to a job set, as business process execution conditions usually change dynamically and in real time. In these embodiments, the dynamic work allocation module 104 enables mapping of the jobs to the appropriate agents using the algorithm system 106.

In one exemplary implementation, the dynamic work allocation module 104 invokes the algorithm system 106. In one embodiment, the dynamic work allocation module 104 provides a list of jobs for processing to the algorithm system 106. For example, the jobs may include new jobs in the system, a work in progress job, a quality checked job, a quality check in progress job, a quality pass job, a quality failed job, a rework job, a reject job, etc. The dynamic work allocation module 104 also gives the algorithm system 106 access to all necessary information related to the jobs. In this embodiment, the algorithm system 106 determines an appropriate algorithm to be used in calculating a demand factor for each job to determine a corresponding job priority.

Based on various scenarios of execution of the business process, different algorithms may be used which are periodically updated. Based on pre-configured requirements, the algorithm system 106 determines best algorithm suited for the business process and selects it. For example, one of the pre-configured requirements may be the mapping of the process to the algorithms.

In some embodiments, the selection of algorithm is dependent on process type and is configured to a system by a process administrator. Once the demand factor is calculated by the selected algorithm for all the jobs in the list of jobs, the algorithm system 106 updates the dynamic work allocation system 104 with new demand factor for each job. The dynamic work allocation system 104 then uses revised list of jobs (e.g., based on the demand factors) to map the jobs to the agents for processing. The mapping process would also require other supply side factors such as agent skill, proficiency, competency, authorization, etc. It is appreciated that the mapping process based on the algorithm system 106 provides most optimum allocation of work as it is based on business and process requirements at the time of mapping.

Figure 2:
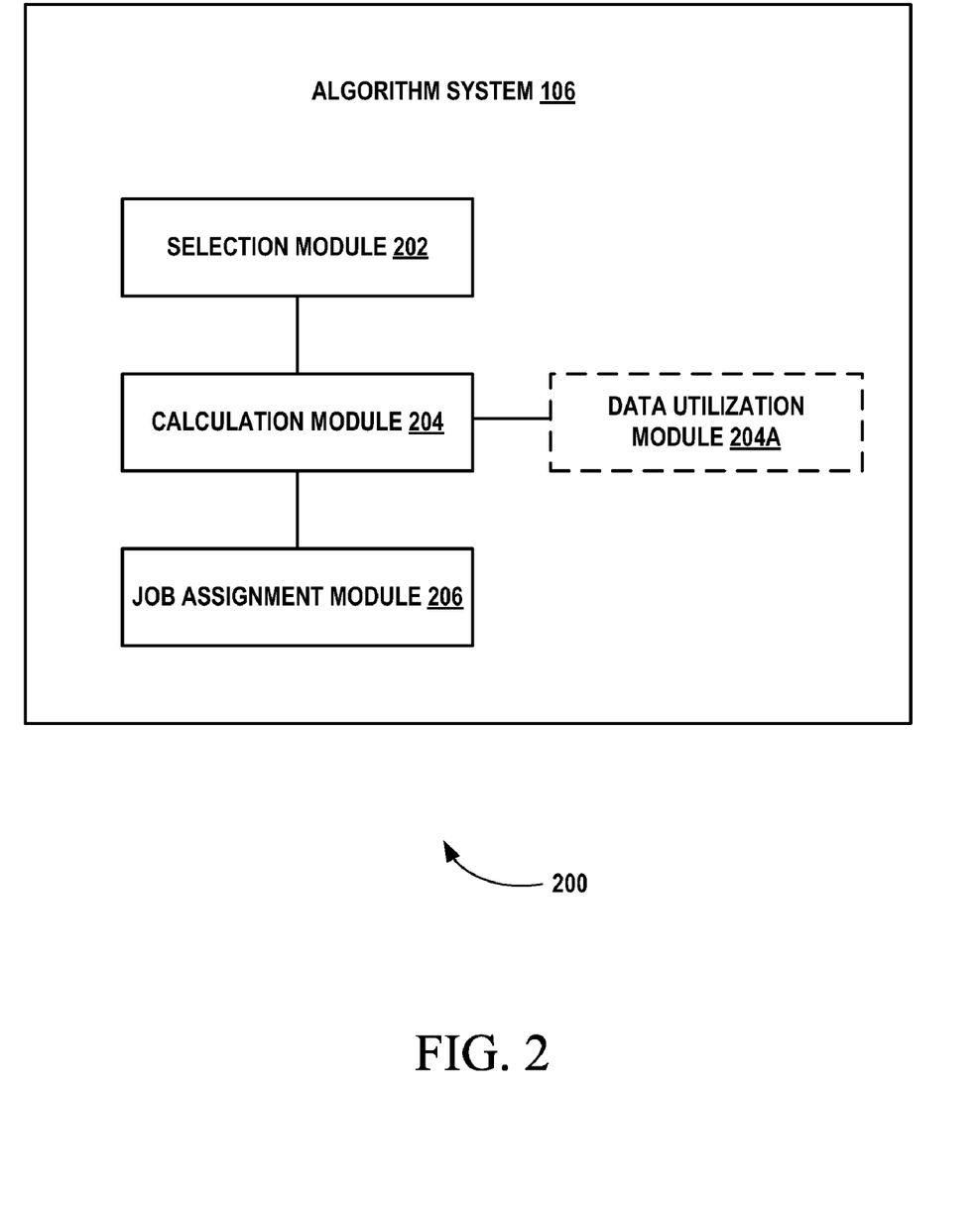
FIG. 2 shows various modules associated with the algorithm system of FIG. 1, according to one embodiment.

FIG. 2 shows various modules associated with the algorithm system 106 of FIG. 1, according to one embodiment. Particularly, FIG. 2 illustrates a selection module 202, a calculation module 204, and a job assignment module 206. Further, the calculation module 204 includes a data utilization module 204A, as illustrated in FIG. 2.

In operation, the selection module 202 selects an algorithm to calculate demand factor for each job in a job list. For example, the job list includes jobs (e.g., in a system) that are to be processed based on the job priority. The calculation module 204 calculates the demand factor using the selected algorithm for each job in the job list that requires a demand factor calculation. Further, the calculation module 204 makes use of the data utilization module 204A (e.g., which utilizes data associated with the jobs) to calculate the demand factor using the selected algorithm.

For example, the data may include aging data of the jobs, job status data, client priority data of the job, and the like. The job assignment module 206 assigns the calculated demand factors (e.g., using the selected algorithm) to the corresponding job in the job list.

In one embodiment, the selected algorithm includes:

$$Di = \Sigma[f(Dj) + f(Dq)],$$

where Di=demand factor, Dj=a demand side factor associated with a job and process instances; f(Dj)=function of the demand side factors associated with the jobs and process instances, Dq=demand side factors associated with job queues; and f(Dq)=function of the demand side factors associated with the job queues.

The demand side factors associated with job queues include:

$$Dq = f(\text{factor 1} \times \text{weightage 1, factor 2} \times \text{weightage 2,} \\ \text{factor 3} \times \text{weightage 3, \ldots, factor "}n\text{"} \times \text{weightage} \\ \text{"}n\text{"})$$

where Dq is a function of "n" demand side factors and weightage refers to weightage of the demand side factors. For example, the demand side factors include a job priority parameter, a client priority parameter, an aging priority parameter, a rework parameter, a restart parameter, a reject parameter, priority tagging of job queues, etc.

Furthermore, the function f(Dq) may use one or a combination of the above demand side factors or some other factors that are part of the demand side factors related to the job queues. For example, the priority tagging of the job queues may include a priority value (e.g., pre-defined priority value, calculated value, etc.), which may be a value selected from a range of values. The range of values is arranged either in an ascending or descending order (e.g., showing low priority value at one end of the range and high priority value at the other end of the range).

In one exemplary implementation, the range of values may be between 1 (implying low priority) to 10 (implying high priority). In another example embodiment, the range of values may be between 1 (implying very high priority) to 10 (implying low priority). The gradation of the range of values may be between 1 to 10, 1 to 100, 1 to 5, 1 to 3, etc. The prefixes attached to each level of the range may be low, medium, high, very high, very low, neutral, or any other classification which allows distinction between the ranges. For example, these are defined as per the process and business requirements.

Further, the demand side factors associated with the jobs and process instances include:

$$Dj = JP1 \times JP2 \times [(JP3 \times Wjp3) + (JP4 \times Wjp4) + (JP5 \times Wjp5) + 1],$$

where JP1=the client priority parameter, JP2=the aging priority parameter, JP3=the rework priority parameter, Wjp3=weightage associated with the rework parameter, JP4=the restart parameter, Wjp4=weightage associated with the restart parameter, JP5=the reject parameter, and Wjp5=weightage associated with the reject parameter.

In one embodiment, ageing priority refers to elapsed time since processing of the job was initiated for first and the aging priority parameter (JP2) includes:

$$JP2 = \left[\frac{1}{2} \times \left\{10 \times \frac{ET}{TAT}\right\}\right],$$

where ET=elapsed time and TAT=turn around time.

It is appreciated that once the algorithm is selected for calculation of demand factor, required data is pulled from the system, based on formula of the selected algorithm. Further, the data is pulled for each job for which the demand factor is to be calculated.

Figure 3:
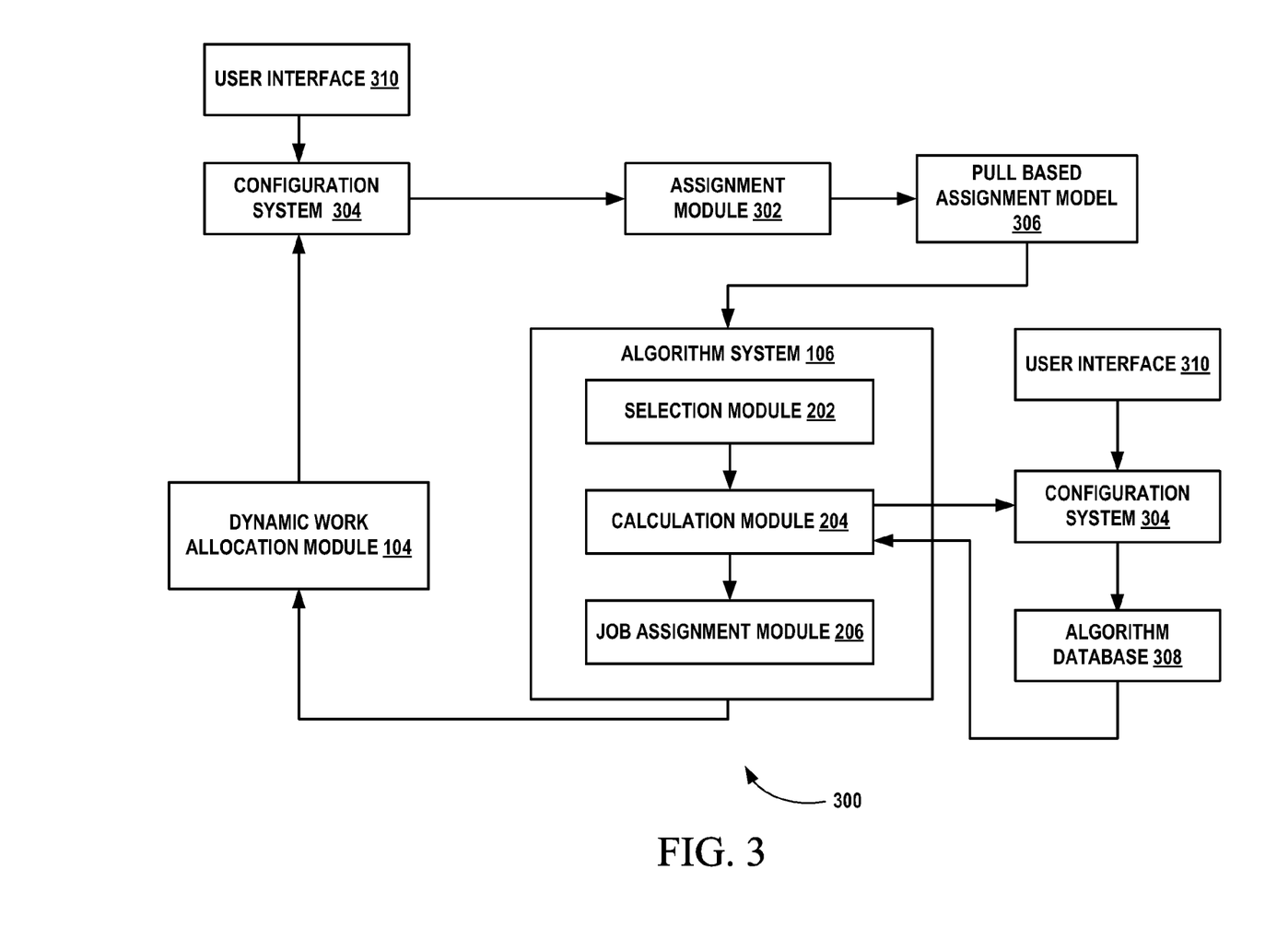
FIG. 3 shows an interaction between the dynamic work allocation module and the algorithm system of FIG. 1, according to one embodiment.

FIG. 3 shows an interaction between the dynamic work allocation module 104 and the algorithm system 106 of FIG. 1, according to one embodiment. Particularly, FIG. 3 illustrates use of the algorithm system 106 by the dynamic work allocation module 104 to determine prioritized sequence of execution of jobs, currently in the system. It is appreciated that the dynamic work allocation module 104 has access to various assignment models which are part of an assignment module 302. The dynamic work allocation module 104 selects a particular assignment model based on the requirements through a configuration system 304 (e.g., based on a rules based framework).

The configuration system 304 allows a process administrator to build rules at two levels, wherein first level of configuration allows the dynamic work allocation module 104 to choose from available assignment models and select one appropriate model which is most suited to the business process, while second level of configuration allows the dynamic work allocation module 104 to choose from various algorithms which are part of the selected assignment model. In one embodiment, the assignment module 302 that interacts with the dynamic work allocation module 104 has a number of assignment models built into it and each of the assignment models has a number of algorithms built in.

Further, an operator (e.g., a process administrator) pre-configures requirements into the configuration system 304. The process administrator defines the business requirements and the process requirements though a user interface 310. For example, business rules may be defined at a system level, process level, resource level and/or at job level. For example, the process administrator may configure the system so that the dynamic work allocation module 104 has access to only a particular set of assignment models. In some embodiments, the dynamic work allocation module 104 may be restricted to only the pull based assignment model 306.

It should be noted that such a business rule may be placed by the process administrator on the system if the pull based assignment models 306 provide the most optimal solution. In one exemplary implementation, based on the requirements defined by the process administrator into the configuration system 304 (or the rules based framework), the dynamic work allocation module 104 selects one of the algorithms from algorithm database 308 as the assignment model to be used for allocation of jobs. Also, the algorithm is selected based as per requirements for each process type.

Figure 4:
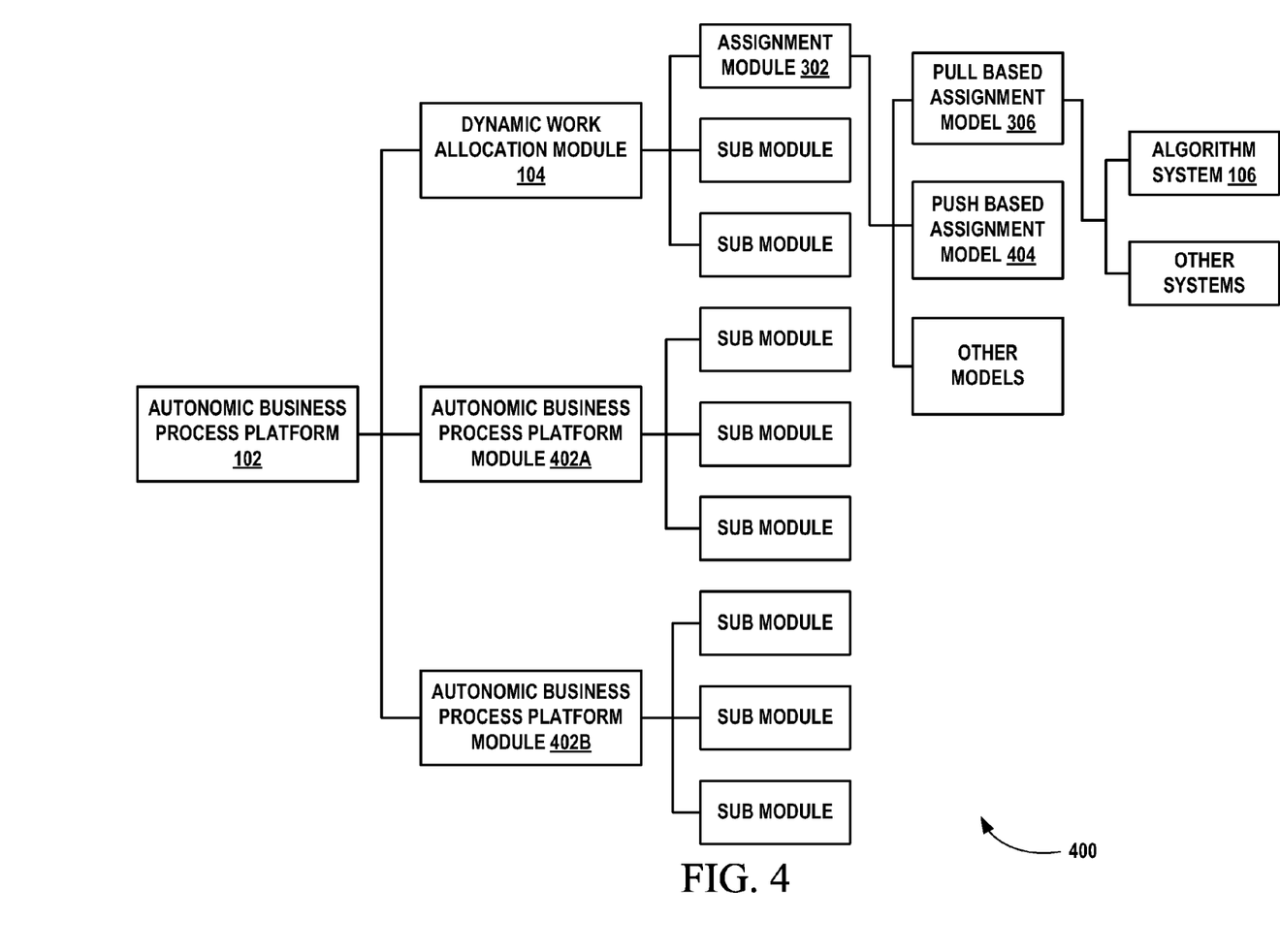
FIG. 4 shows a block diagram illustrating various modules and sub modules associated with the dynamic work allocation module of the autonomic business process platform, according to one embodiment.

FIG. 4 shows a block diagram 400 illustrating various modules and sub modules associated with the dynamic work allocation module 104 of the autonomic business process platform 102, according to one embodiment. Particularly, FIG. 4 illustrates the dynamic work allocation module 104, the algorithm system 106 and the assignment module 302.

In some embodiments, the autonomic business process platform 102 includes a number of in built modules for proper execution of the business processes through enabling necessary functionalities. For example, one such functionality which the autonomic business process platform 102 includes is the dynamic work allocation functionality, enabled through the dynamic work allocation module 104. Autonomic business process platform modules 402A and 402B may enable other functionalities such as quality control management functionality, SLA management functionality, reporting management functionality, etc.

Further, each of the modules of the autonomic business process platform 102 may also have in built sub-modules built to enable particular functionalities. For example, the dynamic work allocation module 104 has among other modules, the assignment module 302 that includes pull based assignment model 306 and push based assignment model 404 among other models, to be used for assignment of jobs to the agents. An example of the pull based assignment model 306 is the use of the algorithm system 106 for determining correct priority order of execution of jobs by the algorithm system 106. Furthermore, the pull based assignment model 306 may use other systems or a combination of all the systems which are part of the pull based assignment model 306 for determining correct priority order of execution of the jobs and may not be limited to use only the algorithm system 106 and its in-built algorithms.

Figure 5:
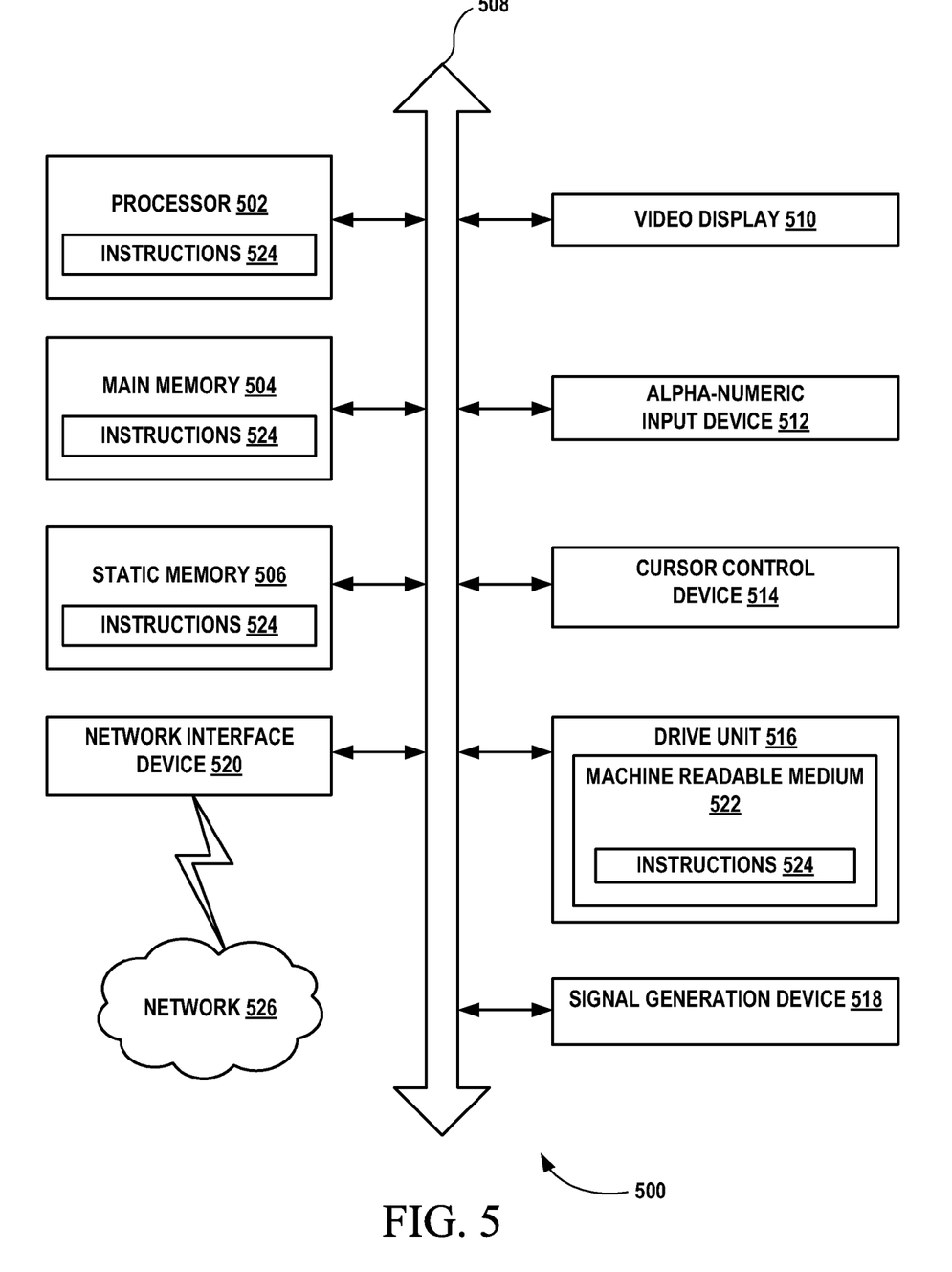
FIG. 5 shows a diagrammatic system view of a data processing system in which any of the embodiments disclosed herein may be performed, according to one embodiment.

FIG. 5 shows a diagrammatic system view 500 of a data processing system in which any of the embodiments disclosed herein may be performed, according to one embodiment. Particularly, the diagrammatic system view 500 of FIG. 5 illustrates a processor 502, a main memory 504, a static memory 506, a bus 508, a video display 510, an alpha-numeric input device 512, a cursor control device 514, a drive unit 516, a signal generation device 518, a network interface device 520, a machine readable medium 522, instructions 524 and a network 526.

The diagrammatic system view 500 may indicate a personal computer and/or a data processing system in which one or more operations disclosed herein are performed. The processor 502 may be a microprocessor, a state machine, an application specific integrated circuit, a field programmable gate array, etc. The main memory 504 may be a dynamic random access memory and/or a primary memory of a computer system. The static memory 506 may be a hard drive, a flash drive, and/or other memory information associated with the data processing system.

The bus 508 may be an inter-connection between various circuits and/or structures of the data processing system. The video display 510 may provide graphical representation of information on the data processing system. The alpha-numeric input device 512 may be a keypad, keyboard and/or any other input device of text (e.g., a special device to aid the physically handicapped). The cursor control device 514 may be a pointing device such as a mouse. The drive unit 516 may be a hard drive, a storage system, and/or other longer term storage subsystem.

The signal generation device 518 may be a bios and/or a functional operating system of the data processing system. The network interface device 520 may perform interface functions (e.g., code conversion, protocol conversion, and/or buffering) required for communications to and from the network 526 between a number of independent devices (e.g., of varying protocols). The machine readable medium 522 may provide instructions on which any of the methods disclosed herein may be performed. The instructions 524 may provide source code and/or data code to the processor 502 to enable any one or more operations disclosed herein.

For example, a storage medium having instructions, that when executed by a computing platform, result in execution of a method of dynamically allocating work in a data processing system, including selecting an algorithm to calculate a demand factor, and calculating the demand factor for each job in a job list using the selected algorithm, assigning the calculated demand factors to the corresponding job in the job list.

In some embodiments, the selected algorithm includes:

$$Di = \Sigma[f(Dj) + f(Dq)],$$

where Di=demand factor, Dj=demand side factors associated with at least one of the jobs and process instances; f(Dj)=function of the demand side factors associated with at least one of the jobs and process instances, Dq=demand side factors associated with job queues; and f(Dq)=function of the demand side factors associated with job queues.

The demand side factors associated with jobs and process instances include:

$$Dj = JP1 \times JP2 \times [(JP3 \times Wjp3) + (JP4 \times Wjp4) + (JP5 \times Wjp5) + 1],$$

where JP1=a client priority parameter, JP2=an aging priority parameter, JP3=a rework priority parameter, Wjp3=weightage associated with the rework parameter, JP4=a restart parameter, Wjp4=weightage associated with the restart parameter, JP5=a reject parameter, and Wjp5=weightage associated with the reject parameter.

Figure 6:
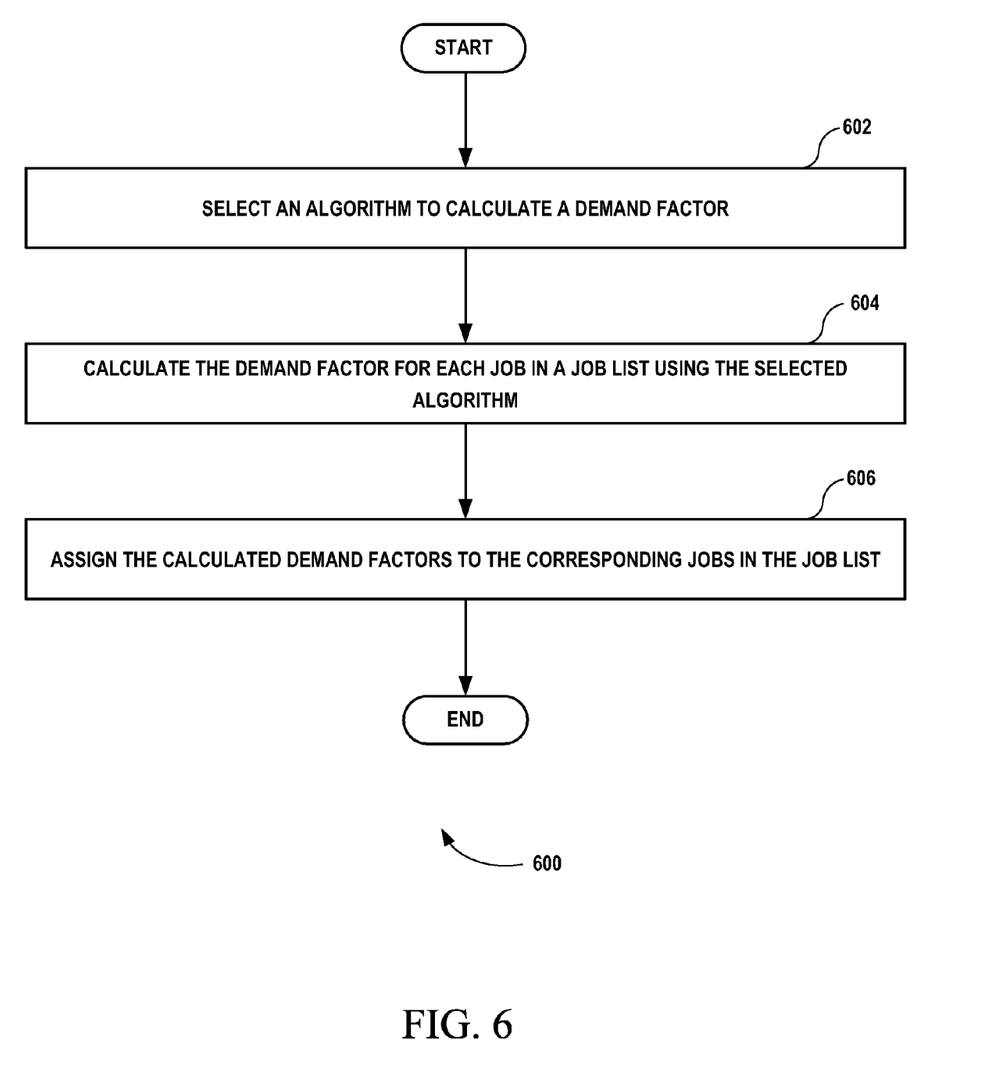
FIG. 6 shows a process flow of calculating and assigning demand factors to corresponding jobs in a job list using a selected algorithm, according to one embodiment.

FIG. 6 shows a process flow 600 of calculating and assigning demand factors to corresponding jobs in a job list using a selected algorithm, according to one embodiment. In operation 602, the algorithm is selected (e.g., from the algorithm database 308 of FIG. 3) to calculate a demand factor. In some embodiments, the selected algorithm is based on:

$$Di = \Sigma[f(Dj) + f(Dq)],$$

where, Di=demand factor, Dj=a demand side factor associated with at least one of jobs and process instances; f(Dj)=function of the demand side factors associated with at least one of the jobs and process instances, Dq=demand side factors associated with job queues; and f(Dq)=function of the demand side factors associated with job queues.

In these embodiments, the demand side factors associated with job queues are based on:

$$Dq = f(\text{factor 1} \times \text{weightage 1, factor 2} \times \text{weightage 2,} \\ \text{factor 3} \times \text{weightage 3, \ldots, factor ``n''} \times \text{weightage ``n''})$$

where Dq is a function of "n" demand side factors.

For example, the demand side factors include a job priority parameter, a client priority parameter, an aging priority parameter, a rework parameter, a restart parameter, and/or a reject parameter.

Further, in these embodiments, the demand side factors associated with at least one of the jobs and process instances are based on:

$$Dj = JP1 \times JP2 \times [(JP3 \times Wjp3) + (JP4 \times Wjp4) + (JP5 \times Wjp5) + 1],$$

where JP1=the client priority parameter, JP2=the aging priority parameter, JP3=the rework priority parameter, Wjp3=weightage associated with the rework parameter, JP4=the restart parameter, Wjp4=weightage associated with the restart parameter, JP5=the reject parameter, and Wjp5=weightage associated with the reject parameter.

In some embodiments, the aging priority parameter (JP2) is given as follows:

$$JP2 = \left[\frac{1}{2} \times \left\{10 \times \frac{ET}{TAT}\right\}\right],$$

where ET=elapsed time and TAT=turn around time.

In one exemplary implementation, operations 604-608 are performed for each job in the job list that requires a demand factor calculation. In operation 604, the demand factor is calculated (e.g., using the calculation module 204 of FIG. 2) using the selected algorithm. In some embodiments, the demand factor is calculated through utilizing data associated with at least one job in the job list to calculate the demand factor using the selected algorithm. For example, the data associated with at least one job may include aging data of the jobs, job status data, client priority data of the job, etc. In operation 606, the calculated demand factors are assigned (e.g., using the job assignment module 206 of FIG. 2) to the corresponding jobs in the job list.

The above-described technique uses computational technique to provide a measurable and scientific methodology to arrive at the optimum job allocation. Further, the above-described system has built in capability of adjusting to the changing realities (e.g., inflow of new jobs to the floor, changes in availability of agents and unpredictable request from the client organization to process certain jobs out of queue).

In addition, the above-described system can be integrated with other enterprise systems to gather critical information on system, process, people and resources. This allows the algorithm to constantly modify and upgrade to operate and leverage on any productivity and/or competence improvement. As jobs get executed, critical execution parameters such as wait times, average handling times, turn-around times, number and type of errors, availability, and productivity and capability data of agents are captured and fed back into the allocation algorithm for optimum allocation of job.

The above-described system depicts a pull system being implemented with the agents pulling jobs from the common pool of prioritized job set as and when required instead of the system pushing the jobs into agent job queues for processing.

Although the present embodiments have been described with reference to specific example embodiments, it will be evident that various modifications and changes may be made to these embodiments without departing from the broader spirit and scope of the various embodiments.

In addition, it will be appreciated that the various operations, processes, and methods disclosed herein may be embodied in a machine-readable medium and/or a machine accessible medium compatible with a data processing system (e.g., a computer system), and may be performed in any order (e.g., including using means for achieving the various operations). Accordingly, the specification and drawings are to be regarded in an illustrative rather than a restrictive sense.

What is claimed is:

1. A computer-implemented method comprising:
selecting an algorithm to calculate a demand factor by an autonomous business process platform running on a computer;
for each job in a job list requiring a demand factor calculation, calculating the demand factor using the selected algorithm by the autonomous business process platform running on the computer, wherein the selected algorithm comprises:

$Di=\Sigma[f(Dj)+f(Dq)]$, wherein Di=demand factor, Dj=a demand side factor associated with at least one of the jobs and process instances; f(Dj)=function of the demand side factors associated with at least one of the jobs and process instances, Dq=demand side factors associated with job queues; and f(Dq)=function of the demand side factors associated with job queues,
wherein the demand side factors associated with job queues comprise:

$Dq=f(\text{factor1}\times\text{weightage1}, \text{factor2}\times\text{weightage2}, \text{factor3}\times\text{weightage3}, \ldots, \text{factor"}n\text{"}\times\text{weightage"}n\text{"})$ wherein Dq is a function of "n" demand side factors related to the job queues, wherein f(Dq) refers to one or a combination of the "n" demand side factors related to the job queues, wherein the demand side factors are selected from a group consisting essentially of a job priority parameter, a client priority parameter, an aging priority parameter, a rework parameter, a restart parameter, and a reject parameter,
wherein the function of demand side factors associated with at least one of the jobs and process instances comprise:

$f(Dj)=JP1\times JP2\times[(JP3\times Wjp3)+(JP4\times Wjp4)+(JP5\times Wjp5)+1]$, wherein, JP1=the client priority parameter, JP2=the aging priority parameter, JP3=the rework priority parameter, Wjp3=weightage associated with the rework parameter, JP4=the restart parameter, Wjp4=weightage associated with the restart parameter, JP5=the reject parameter, and Wjp5=weightage associated with the reject parameter, wherein the aging priority parameter (JP2) comprises:

$$JP2 = \left[\frac{1}{2}\times\left\{10\times\frac{ET}{TAT}\right\}\right],$$

wherein, ET=elapsed time and TAT=turn around time; and
assigning the calculated demand factors to the corresponding jobs in the job list by the autonomous business process platform running on the computer.

2. A system comprising:
a processor; and
memory coupled to the processor, wherein the memory includes:
a selection module to select an algorithm to calculate a demand factor;
a calculation module to calculate, for each job in a job list requiring a demand factor calculation, the demand factor using the selected algorithm, wherein the selected algorithm comprises:

$Di=\Sigma[f(Dj)+f(Dq)]$, wherein, Di=demand factor, Dj=a demand side factor associated with at least one of the jobs and process instances; f(Dj)=function of the demand side factors associated with at least one of the jobs and process instances, Dq=demand side factors associated with job queues; and f(Dq)=function of the demand side factors associated with job queues,
wherein the demand side factors associated with job queues comprise:

$Dq=f(\text{factor1}\times\text{weightage1}, \text{factor2}\times\text{weightage2}, \text{factor3}\times\text{weightage3}, \ldots, \text{factor"}n\text{"}\times\text{weightage"}n\text{"})$ wherein, Dq is a function of "n" demand side factors related to the job queues, and wherein f(Dq) refers to one or a combination of the "n" demand side factors related to the job queues, wherein the demand side factors are selected from a group consisting essentially of a job priority parameter, a client priority parameter, an aging priority parameter, a rework parameter, a restart parameter, and a reject parameter, wherein the function of the demand side factors associated with at least one of the jobs and process instances comprise:

$f(Dj)=JP1 \times JP2 \times [(JP3 \times Wjp3)+(JP4 \times Wjp4)+(JP5 \times Wjp5)+1]$, wherein, JP1=the client priority parameter, JP2=the aging priority parameter, JP3=the rework priority parameter, Wjp3=weightage associated with the rework parameter, JP4=the restart parameter, Wjp4=weightage associated with the restart parameter, JP5=the reject parameter, and Wjp5=weightage associated with the reject parameter, wherein the aging priority parameter (JP2) comprises:

$$JP2 = \left[\frac{1}{2} \times \left\{10 \times \frac{ET}{TAT}\right\}\right],$$

wherein, ET=elapsed time and TAT=turn around time; and a job assignment module to assign the calculated demand factors to the corresponding job in the job list.

3. The method of claim 1, wherein calculating the demand factor using the selected algorithm comprises:
utilizing data associated with at least one job in the job list to calculate the demand factor using the selected algorithm.

4. The method of claim 3, wherein the data is selected from the group essentially consisting of aging data of the lobs, job status data, and client priority data of the job.

5. The method of claim 1, further comprising dynamically allocating the jobs to agents based on the assigned demand factors.

6. The system of claim 2, wherein the calculation module comprises:
a data utilization module to utilize data associated with at least one job in the job list to calculate the demand factor using the selected algorithm.

7. The system of claim 6, wherein the data is selected from the group essentially consisting of aging data of the lobs, job status data, and client priority data of the job.

8. The system of claim 2, wherein the job assignment module dynamically allocates the jobs to agents based on the assigned demand factors.

9. An article, comprising:
a non-transitory computer readable storage medium having instructions, that when executed by a computing platform, result in execution of a method of dynamically allocating work in a data processing system, comprising:
selecting an algorithm to calculate a demand factor;
for each job in a job list requiring a demand factor calculation, calculating the demand factor using the selected algorithm, wherein the selected algorithm comprises:

$Di=\Sigma[f(Dj)+f(Dq)]$, wherein Di=demand factor, Dj=a demand side factor associated with at least one of the jobs and process instances; f(Dj)=function of the demand side factors associated with at least one of the jobs and process instances, Dq=demand side factors associated with job queues; and f(Dq)=function of the demand side factors associated with job queues, wherein the demand side factors associated with job queues comprise:

$Dq=f(\text{factor1} \times \text{weightage1}, \text{factor2} \times \text{weightage2}, \text{factor3} \times \text{weightage3}, \ldots, \text{factor}"n" \times \text{weightage}"n")$ wherein Dq is a function of "n" demand side factors related to the job queues, wherein f(Dq) refers to one or a combination of the "n" demand side factors related to the job queues, wherein the demand side factors are selected from a group consisting essentially of a job priority parameter, a client priority parameter, an aging priority parameter, a rework parameter, a restart parameter, and a reject parameter, wherein the function of demand side factors associated with at least one of the jobs and process instances comprise:

$f(Dj)=JP1 \times JP2 \times [(JP3 \times Wjp3)+(JP4 \times Wjp4)+(JP5 \times Wjp5)+1]$, wherein, JP1=the client priority parameter, JP2=the aging priority parameter, JP3=the rework priority parameter, Wjp3=weightage associated with the rework parameter, JP4=the restart parameter, Wjp4=weightage associated with the restart parameter, JP5=the reject parameter, and Wjp5=weightage associated with the reject parameter, wherein the aging priority parameter (JP2) comprises:

$$JP2 = \left[\frac{1}{2} \times \left\{10 \times \frac{ET}{TAT}\right\}\right],$$

wherein, ET=elapsed time and TAT=turn around time; and assigning the calculated demand factors to the corresponding jobs in the job list.

10. The article of claim 9, wherein calculating the demand factor using the selected algorithm comprises:
utilizing data associated with at least one job in the job list to calculate the demand factor using the selected algorithm.

11. The article of claim 10, wherein the data is selected from the group essentially consisting of aging data of the jobs, job status data, and client priority data of the job.

12. The article of claim 9, further comprising dynamically allocating the lobs to agents based on the assigned demand factors.

* * * * *